United States Patent
El-Markhi et al.

(10) Patent No.: US 12,483,133 B2
(45) Date of Patent: Nov. 25, 2025

(54) DUAL LOOP VOLTAGE CLAMP

(71) Applicant: TEXAS INSTRUMENTS INCORPORATED, Dallas, TX (US)

(72) Inventors: Mustapha El-Markhi, Richardson, TX (US); Avadhut Junnarkar, McKinney, TX (US); Sigfredo Gonzalez Diaz, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 339 days.

(21) Appl. No.: 18/059,947

(22) Filed: Nov. 29, 2022

(65) Prior Publication Data

US 2024/0178756 A1    May 30, 2024

(51) Int. Cl.
*H02M 3/158*    (2006.01)
*H02M 1/08*    (2006.01)

(52) U.S. Cl.
CPC ............. *H02M 3/158* (2013.01); *H02M 1/08* (2013.01)

(58) Field of Classification Search
CPC ...... H02M 3/158; H02M 1/08; H02M 3/1588; H02M 1/342; H02M 1/32; H02M 1/088
See application file for complete search history.

(56) References Cited

U.S. PATENT DOCUMENTS

| | | | |
|---|---|---|---|
| 11,641,198 B1* | 5/2023 | Hashim | H03K 17/0822 327/109 |
| 11,817,281 B2* | 11/2023 | Gopalan | H01H 3/001 |
| 11,996,847 B1* | 5/2024 | Kazama | H02M 3/155 |
| 2015/0077076 A1* | 3/2015 | Bhattad | G05F 1/56 323/280 |
| 2017/0250609 A1* | 8/2017 | Zhang | H02M 1/08 |

* cited by examiner

*Primary Examiner* — Kyle J Moody
(74) *Attorney, Agent, or Firm* — Frank D. Cimino

(57) ABSTRACT

A dual loop clamp circuit includes a clamp circuit and a low-side driver circuit. The clamp circuit includes a clamp enable output and a low-side clamp output. The low-side driver circuit includes a low-side control signal input and an output stage. The output stage includes a low-side drive output and an input. The low-side drive output is coupled to the low-side clamp output. The input of the output stage is coupled to the clamp enable output and the low-side control signal input.

19 Claims, 4 Drawing Sheets

DUAL LOOP VOLTAGE CLAMP

BACKGROUND

A DC-DC converter is an electronic circuit that converts an input direct current (DC) voltage into one or more DC output voltages that are higher or lower in magnitude than the input DC voltage. A DC-DC converter that generates an output voltage lower than the input voltage is termed a buck or step-down converter. A DC-DC converter that generates an output voltage higher than the input voltage is termed a boost or step-up converter.

Some DC-DC converter topologies include a drive/power switch coupled at a switch node to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle of the switch and the frequency of the switching signal. DC-DC converters are widely used in electronic devices, particularly battery powered devices, such as portable cellular phones, laptop computers, and other electronic systems in which efficient use of power is desirable.

SUMMARY

Examples of a dual loop clamp circuit suitable for use in a DC-DC converter are described herein. In one example, a dual loop clamp circuit includes a clamp circuit and a low-side driver circuit. The clamp circuit includes a clamp enable output and a low-side clamp output. The low-side driver circuit includes a low-side control signal input and an output stage. The output stage includes a low-side drive output and an input. The low-side drive output is coupled to the low-side clamp output. The input of the output stage is coupled to the clamp enable output and the low-side control signal input.

In another example, a dual loop clamp circuit includes a clamp circuit and a low-side driver circuit. The clamp circuit is configured to monitor a voltage at a switching terminal, and provide a clamp enable signal based on the voltage at the switching terminal exceeding a clamp threshold voltage. The low-side driver circuit is coupled to the clamp circuit. The low-side driver circuit is configured to draw a first current from a drive output responsive to receipt of a low-side control signal at a low-side control signal input. The low-side driver circuit is also configured to draw a second current, that is smaller than first current, from the drive output responsive to the clamp enable signal.

In a further example, a DC-DC converter includes a high-side transistor, a low-side transistor, a clamp circuit, and a low-side driver circuit. The high-side transistor includes a first current terminal and a second current terminal. The first current terminal is coupled to a power supply terminal. The low-side transistor includes a first current terminal, a second current terminal, and a control terminal. The first current terminal of the low-side transistor is coupled to the second current terminal of the high-side transistor. The second current terminal of the low-side transistor is coupled to a ground terminal. The clamp circuit is coupled between the first current terminal of the low-side transistor and the control terminal of the low-side transistor. The clamp circuit is configured to provide a clamp enable signal responsive to a voltage at the first current terminal of the low-side transistor exceeding a clamp threshold voltage. The clamp circuit is also configured to activate the low-side transistor responsive to the clamp enable signal. The low-side driver circuit is configured to weaken drive to the control terminal of the low-side transistor responsive to the clamp enable signal. The low-side driver circuit includes an input coupled to the clamp circuit, and an output coupled to the control terminal of the low-side transistor.

DETAILED DESCRIPTION

Efficiency is an important consideration in DC-DC converters. To increase efficiency, gate drivers provide rapid turn-on and turn-off the DC-DC converter power transistors, and the power transistors provide low on resistance. However, rapid turn-on and turn-off increases ringing, which increases the drain-source voltage ($V_{DS}$) across the power transistors. The power transistors may be damaged if the $V_{DS}$ exceeds the transistor's safe operating voltage. Power transistor breakdown voltage may fall with reduced specific on-resistance, which increases the likelihood of transistor damage due to ringing overvoltage.

DC-DC converters may include $V_{DS}$ clamp circuits to protect the power transistors. When the high-side power transistor is being turned on, gate driver circuitry turns off the low-side power transistor (by pulling down its gate), and then turns on the high-side power transistor. If ringing increases the $V_{DS}$ across the low-side power transistor to a level that may be damaging, a clamp circuit may momentarily increase the voltage at the gate of the low-side power transistor, to turn on the low-side power transistor and reduce the $V_{DS}$ to a safe level. In this situation, the gate of the low-side power transistor is being pulled down by the driver circuitry and pulled up by the clamp circuit, which is inefficient. To provide better pull up, the size of a clamp transistor coupled to the gate of the low-side power transistor may be increased, which can also increase the response time of the clamp transistor.

The dual loop clamp circuit described herein includes a primary loop that controls a clamp transistor, and a secondary loop that controls the low-side gate driver. When $V_{DS}$ across the low-side power transistor exceeds a clamp threshold voltage, the primary loop is activated to pull up the gate of the low-side power transistor. As the primary loop is activated, the secondary loop is also activated. The secondary loop reduces the gate voltage of a transistor in the low-side gate driver that pulls down the gate of the low-side power transistor, thereby enabling the clamp circuit to more easily pull up the gate of the low-side power transistor. Accordingly, the secondary loop complements the primary loop to increase the efficiency and speed of the dual loop voltage clamp circuit relative to single loop clamp circuits. By providing faster response, the dual loop clamp circuit enables clamping and regulation at lower voltages and with improved margin from the low-side power transistor breakdown voltage. Additionally, the size of the clamp transistor can be reduced to reduce cost and circuit area. Reduced clamp voltage enables the use of power transistors with a lower voltage rating, which further reduces circuit area. For example, if the reduced clamp voltage provided by a dual loop clamp circuit allows the use of 7 volt transistors, rather than 11 volt transistors, overall circuit area may be reduced by about 20%.

Figure 1:
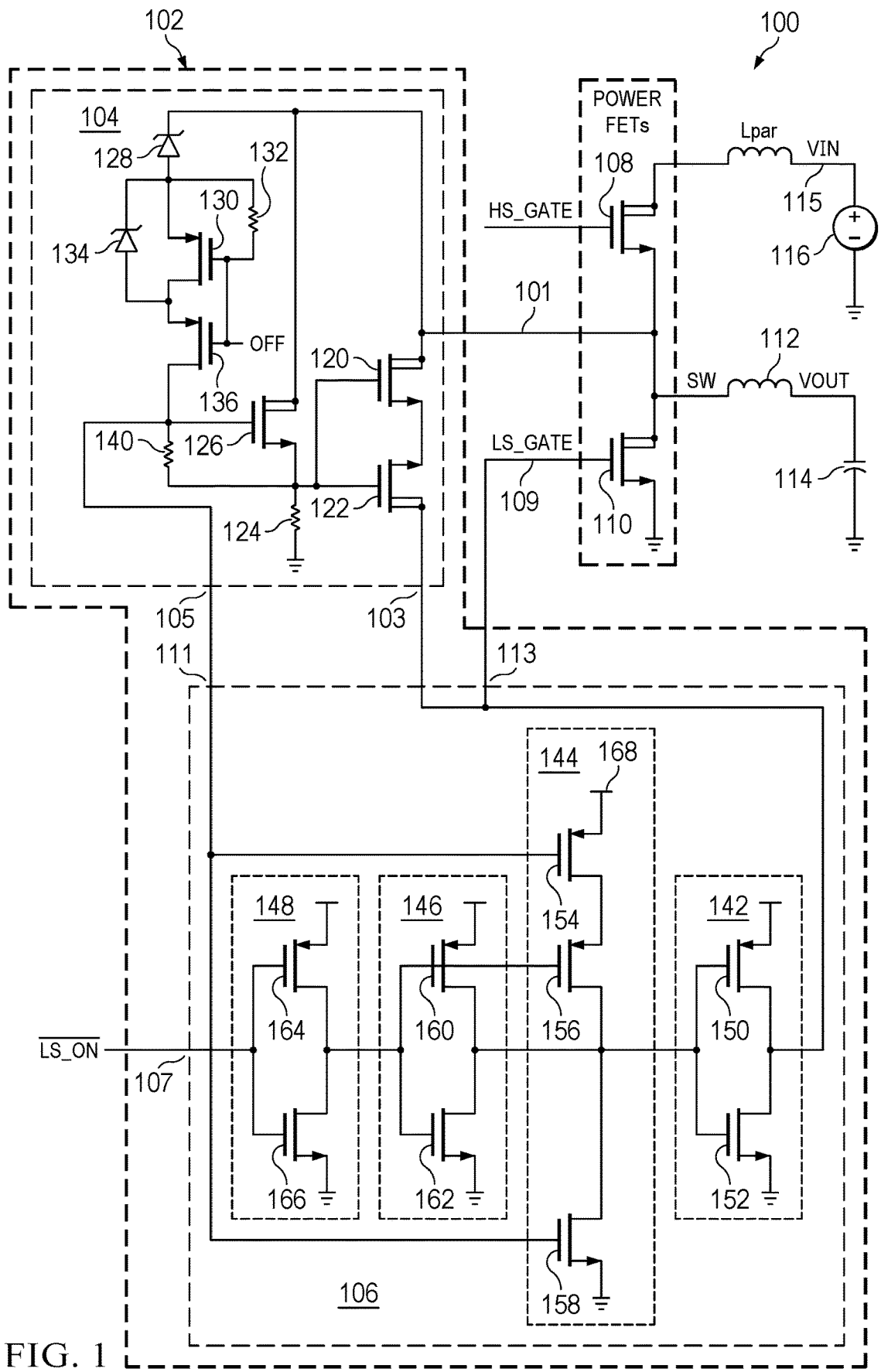
FIG. 1 is a schematic level diagram for an example dual loop clamp circuit in a DC-DC converter.

FIG. 1 is a schematic level diagram for an example dual loop clamp circuit 102 in a DC-DC converter 100. To promote clarity, various components (e.g., error amplifier, pulse width modulation circuitry, etc.) of DC-DC converter 100 have been omitted from FIG. 1. More specifically, in the DC-DC converter 100, a high-side transistor 108, a low-side transistor 110, an inductor 112, and an output capacitor 114 are shown. A drain of the high-side transistor 108 is coupled to a power input terminal 115 and a voltage source 116 (e.g., a battery or AC-DC power supply) via a parasitic inductance (Lpar). The high-side transistor 108 and the low-side transistor 110 may be an n-channel metal oxide semiconductor field effect transistors (MOSFETs). A source of the high-side transistor 108 is coupled to the inductor 112, and the inductor 112 is coupled to the output capacitor 114. A drain of the low-side transistor 110 is coupled to the source of the high-side transistor 108, and the source of the low-side transistor 110 is coupled to a ground terminal. The gate of the high-side transistor 108 is coupled to a high-side driver circuit (not shown) that is configured to rapidly charge and discharge the gate capacitance of the high-side transistor 108. Parasitic inductance in the DC-DC converter 100 causes ringing at the drain and/or the source of the high-side transistor 108 and the low-side transistor 110 during switching.

The dual loop clamp circuit 102 is coupled to the high-side transistor 108 and the low-side transistor 110 to suppress ringing at the source of the high-side transistor 108 and the drain of the low-side transistor 110, and prevent the voltage at the drain of the low-side transistor 110 from exceeding a clamp threshold voltage. The dual loop clamp circuit 102 includes a clamp circuit 104, and a low-side driver circuit 106. The clamp circuit 104 monitors the voltage at the drain of the low-side transistor 110. If the voltage at the drain of the low-side transistor 110 exceeds a clamp threshold voltage, the clamp circuit 104 switches current to (pulls up) the gate of the low-side transistor 110, to turn on the low-side transistor 110, and reduce the voltage across the low-side transistor 110. The low-side driver circuit 106 drives the gate of the low-side transistor 110 (responsive to a low-side transistor control signal) for turning the low-side transistor 110 on and off to charge and discharge the inductor 112. When the low-side driver circuit 106 is pulling the gate of the low-side transistor 110 low to turn off the low-side transistor 110, and the clamp circuit 104 detects voltage above the clamp threshold voltage at the drain of the low-side transistor 110, the low-side driver circuit 106 weakens the drive (the pull-down of the gate) of the low-side transistor 110 to allow the clamp circuit 104 to more easily pull up the gate of the low-side transistor 110 and turn on the low-side transistor 110.

The clamp circuit 104 includes a transistor 120, a transistor 122, a resistor 124, a transistor 126, a Zener diode 128, a transistor 130, a resistor 132, a Zener diode 134, a transistor 136, and a resistor 140. The transistor 120, the transistor 122, and the transistor 126 may be n-channel field effect transistors (NFETs). The transistor 130 and the transistor 136 may be a p-channel field effect transistors (PFETs). The clamp circuit 104 includes a switching terminal 101, a low-side clamp output 103, and a clamp enable output 105. The switching terminal 101 is coupled to the drain of the low-side transistor 110. The low-side clamp output 103 is coupled to the gate of the low-side transistor 110.

When the voltage at the switching terminal 101 exceeds the clamp threshold voltage, the transistor 120 and the transistor 122 are turned on to charge the gate of the low-side transistor 110, turn on the low-side transistor 110, and reduce the voltage across the low-side transistor 110. A first current terminal (e.g., drain) of the transistor 120 is coupled to the switching terminal 101 and the drain of the low-side transistor 110. A second current terminal (e.g., source) of the transistor 120 is coupled to a first current terminal (e.g., source) of the transistor 122. A second current terminal (e.g., drain) of the transistor 122 is coupled to the low-side clamp output 103 to drive the gate of the low-side transistor 110. A control terminal (e.g., gate) of the transistor 120 is coupled to the control terminal (e.g., gate) of the transistor 122.

The resistor 124 is coupled between the control terminal of the transistor 122 and the ground terminal. The transistor 126 switches current from the switching terminal 101 to the control terminal of the transistor 120 and the control terminal of the transistor 122. A first current terminal (e.g., drain) of the transistor 126 is coupled to the switching terminal 101, and a second current terminal (e.g., source) of the transistor 126 is coupled to the control terminal of the transistor 122 and the control terminal of the transistor 120.

The Zener diode 128 includes a cathode coupled to the switching terminal 101, and an anode coupled to a first current terminal (e.g., source) of the transistor 130. The resistor 132 is coupled between the first current terminal of the transistor 130 and a control terminal (e.g., gate) of the transistor 130. A second current terminal (e.g., drain) of the transistor 130 is coupled to a first current terminal (e.g., source) of the transistor 136. A second current terminal (e.g., drain) of the transistor 136 is coupled to the control terminal of the transistor 126 and the clamp enable output 105. A control terminal (e.g., gate) of the transistor 136 is coupled to the control terminal of the transistor 130, and to a clamp on/off terminal for receipt of a signal (OFF) that enables or disables the clamp circuit 104. The resistor 140 is coupled between the control terminal of the transistor 126 and the control terminal of the transistor 122.

The Zener diode 134 includes a cathode coupled to the first current terminal of the transistor 130, and an anode coupled to the second current terminal of the transistor 130. The resistor 132 is coupled between the first current terminal of the transistor 130 and the control terminal (e.g., gate) of the transistor 130. When the voltage at the switching terminal 101 exceeds the reverse breakdown voltage of the Zener diode 128, current flows through the transistor 130 and the transistor 136. The voltage developed across the resistor 140 turns on the transistor 126, and the voltage developed across the resistor 124 turns on the transistor 120 and the transistor 122. When the voltage across the resistor 124 exceeds the thresholds of the transistor 120 and transistor 122, current flows through the transistor 120 and the transistor 122 to the low-side clamp output 103 and the gate of the low-side transistor 110, to clamp the voltage at the drain of the low-side transistor 110.

The low-side driver circuit 106 includes a low-side control signal input 107, a drive output 113, a clamp enable input 111, an output stage 142, a clamp enable stage 144, an intermediate stage 146, and an input stage 148. The clamp enable input 111 is coupled to the clamp enable output 105 for receipt of a clamp enable signal generated by the clamp circuit 104 responsive to voltage at the switching terminal 101 exceeding the clamp threshold voltage. A low-side drive output of the output stage 142 is coupled to the drive output 113 for providing a low-side gate drive signal 109 to the gate of the low-side transistor 110. The low-side driver circuit 106 sets the low-side gate drive signal 109 to a gate charge state (gate-to-source voltage exceeding the threshold of the low-side transistor 110) to turn on the low-side transistor 110, and sets the low-side gate drive signal 109 to a gate discharge state (gate-to-source voltage less than the threshold voltage of the low-side transistor 110) to turn off the low-side transistor 110. An input of the output stage 142 is coupled to the clamp enable stage 144 and the intermediate stage 146. The output stage 142 includes a transistor 150 and a transistor 152 arranged as a digital inverter circuit. The transistor 150 may be a PFET and the transistor 152 may be an NFET. A first current terminal (e.g., source) of the transistor 150 is coupled to a power terminal 168. A second current terminal (e.g., drain) of the transistor 150 is coupled to a first current terminal (e.g., drain) of the transistor 152 and the drive output 113. A second current terminal (e.g., source) of the transistor 152 is coupled to a ground terminal. A control terminal (e.g., gate) of the transistor 150 is coupled to a control terminal (e.g., gate) of the transistor 152 and to the clamp enable stage 144 and the intermediate stage 146.

The clamp enable stage 144 includes a transistor 154, a transistor 156, and a transistor 158. The transistor 154 and the transistor 156 may be PFETs, and the transistor 152 may be an NFET. The transistor 154 controls flow of current from the power terminal 168 to the transistor 156 based on the clamp enable signal received from the clamp circuit 104. A first current terminal (e.g., source) of the transistor 154 is coupled to the power terminal 168. A second current terminal (e.g., drain) of the transistor 154 is coupled to a first current terminal (e.g., source) of the transistor 156. A control terminal (e.g., gate) of the transistor 154 is coupled to the clamp enable input 111. When the clamp enable signal is active (the clamp circuit 104 is attempting to turn on the low-side transistor 110 to clamp the voltage at the drain of the low-side transistor 110), the transistor 154 disables current flow from the power terminal 168 to the transistor 156.

A second current terminal (e.g., drain) of the transistor 156 is coupled to the input of the output stage 142 and a first current terminal (e.g., drain) of the transistor 158. A control terminal of the transistor 156 is coupled to the output of the input stage 148. When the clamp enable signal is inactive (the clamp circuit 104 is not attempting to turn on the low-side transistor 110), the transistor 156 switches current from the power terminal 168 to the input of the output stage 142 based on an output signal of the input stage 148. A second current terminal (e.g., source) of the of the transistor 158 is coupled to a ground terminal. A control terminal (e.g., gate) of the transistor 158 is coupled to the clamp enable input 111. When the clamp enable signal is active (the clamp circuit 104 is attempting to turn on the low-side transistor 110 to clamp the voltage at the drain of the low-side transistor 110), the transistor 158 draws current from the input of the output stage 142, which weakens the pull-down of the low-side gate drive signal 109 by the transistor 152 allowing the clamp circuit 104 to more easily pull-up the gate of the low-side transistor 110, and turn on the low-side transistor 110. Accordingly, the clamp enable stage 144 triggers the output stage 142 to set the low-side gate drive signal to the gate charge state based on the state of the clamp circuit 104. By placing the clamp enable stage 144 at the input of the output stage 142, the clamp enable stage 144 acts directly on the output stage 142, which reduces the time delay from detection of a transient at the switching terminal 101 to activation of the low-side transistor 110 to clamp the transient.

The intermediate stage 146 includes a transistor 160 and a transistor 162 arranged as a digital inverter circuit. The transistor 160 may be a PFET and the transistor 162 may be an NFET. A first current terminal (e.g., source) of the transistor 160 is coupled to a power terminal 168. A second current terminal (e.g., drain) of the transistor 160 is coupled to a first current terminal (e.g., drain) of the transistor 162, the second current terminal of the transistor 156, and the control terminal of the transistor 150. A second current terminal (e.g., source) of the transistor 162 is coupled to a ground terminal. A control terminal (e.g., gate) of the transistor 160 is coupled to a control terminal (e.g., gate) of the transistor 162, the control terminal of the transistor 156, and the input stage 148.

The input stage 148 includes a transistor 164 and a transistor 166 arranged as a digital inverter circuit. The transistor 164 may be a PFET and the transistor 166 may be an NFET. The input stage 148 generates an inverted version of the low-side control signal ($\overline{LS\_ON}$). A first current terminal (e.g., source) of the transistor 164 is coupled to a power terminal 168. A second current terminal (e.g., drain) of the transistor 164 is coupled to a first current terminal (e.g., drain) of the transistor 166, the control terminal of the transistor 160, and the control terminal of the transistor 156. A second current terminal (e.g., source) of the transistor 166 is coupled to a ground terminal. A control terminal (e.g., gate) of the transistor 164 is coupled to the low-side control signal input 107 for receipt of $\overline{LS\_ON}$.

Figure 2:
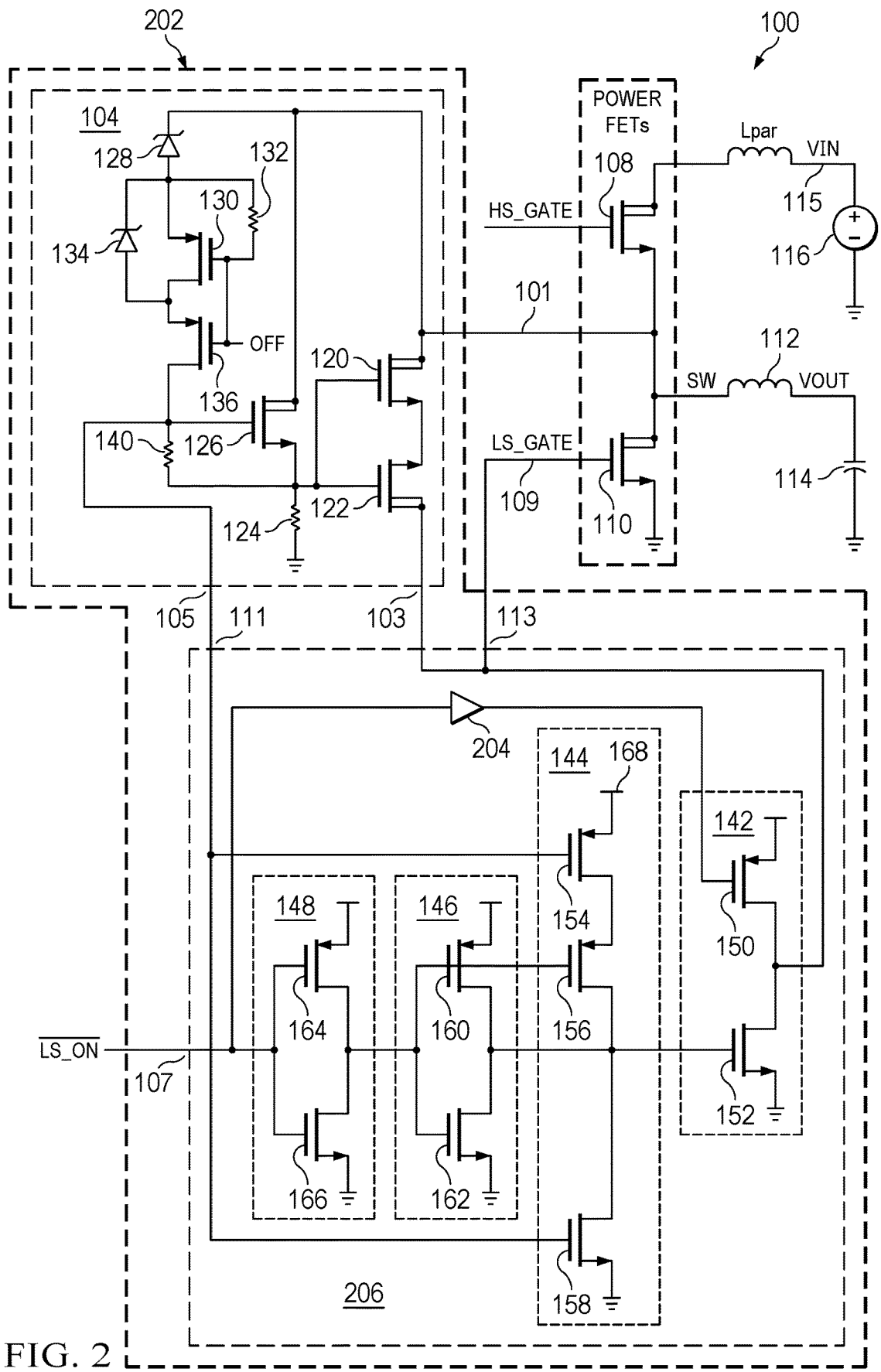
FIG. 2 is a schematic level diagram for another example dual loop clamp circuit in a DC-DC converter.

FIG. 2 is a schematic level diagram for an example dual loop clamp circuit 202 in a DC-DC converter 200. The DC-DC converter 200 is similar to the DC-DC converter 100. The DC-DC converter 200 includes the high-side transistor 108, the low-side transistor 110, the inductor 112, the output capacitor 114, as described with respect to the DC-DC converter 100. The DC-DC converter 200 includes the dual loop clamp circuit 202 in place of the dual loop clamp circuit 102 of the low-side driver circuit 106. The 202 is similar to the 102, and includes the clamp circuit 104 and a low-side driver circuit 206. The low-side driver circuit 206 is similar to the low-side driver circuit 106. The low-side driver circuit 206 includes the output stage 142, the clamp enable stage 144, the intermediate stage 146, and the input stage 148 as described with respect to the low-side driver circuit 106. However, in the low-side driver circuit 206, the control terminal of the transistor 150 is coupled to a buffer 204, rather than to the clamp enable stage 144 and the intermediate stage 146 as in the low-side driver circuit 106. The buffer 204 includes an input coupled to the low-side control signal input 107 and an output coupled to the control terminal of the transistor 150. Accordingly, in the low-side driver circuit 206, the transistor 150 is turned on and off by the control signal $\overline{LS\_ON}$ received at the low-side control signal input 107, and control of the transistor 150 is isolated from operation of the clamp enable stage 144.

As in the low-side driver circuit 106, when the clamp enable signal is active (the clamp circuit 104 is attempting to turn on the low-side transistor 110 to clamp the voltage at the drain of the low-side transistor 110), the transistor 158 draws current from the control terminal of the transistor 152 (from the input of the output stage 142), which weakens the pull-down of the low-side gate drive signal 109 by the transistor 152 allowing the clamp circuit 104 to more easily pull-up the gate of the low-side transistor 110, and turn on the low-side transistor 110.

Figure 3:
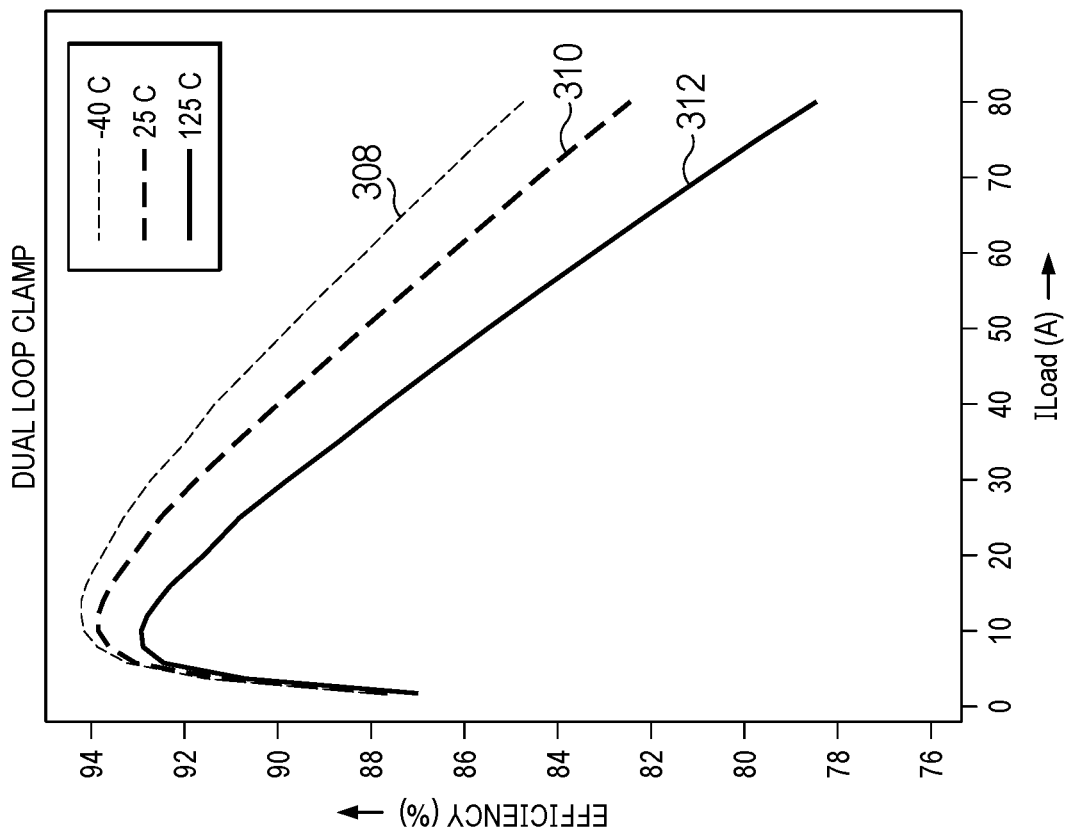
FIG. 3 is a graph of example efficiency versus load current for a DC-DC converter with a single loop clamp circuit and the DC-DC converter of FIG. 1 or FIG. 2.
Figure 3:
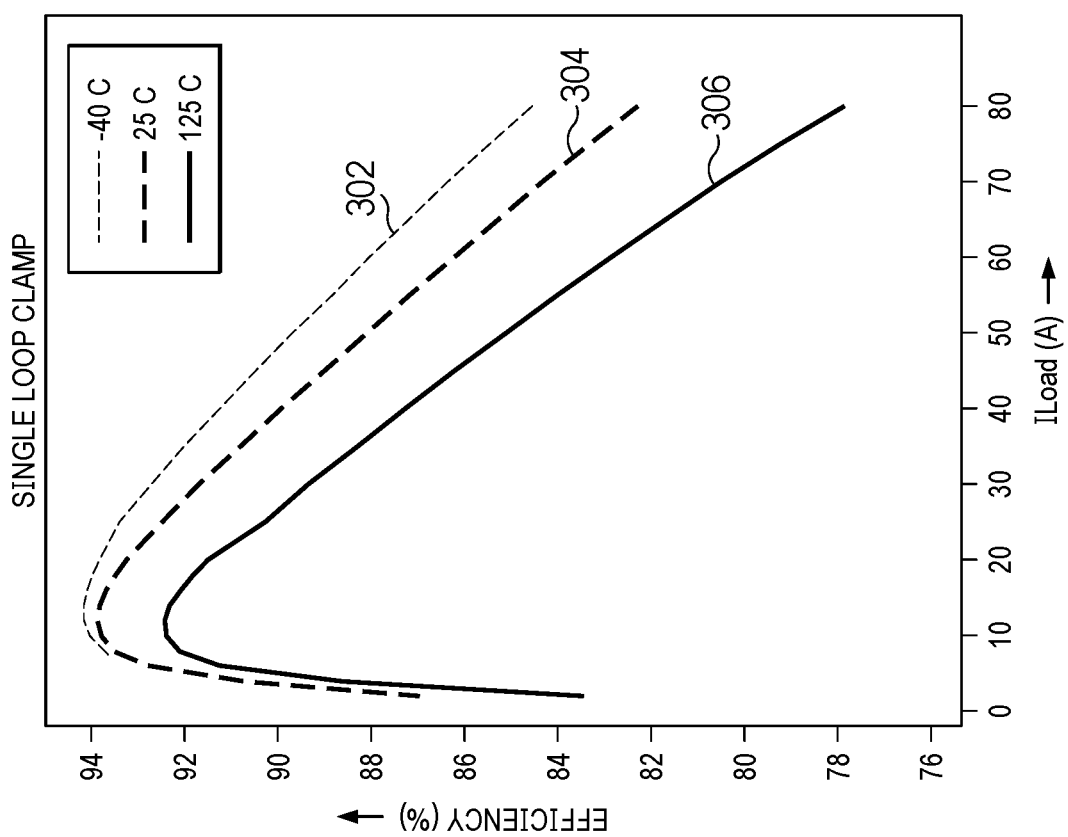

FIG. 3 is a graph of example efficiency versus load current for a DC-DC converter with a single loop clamp circuit and the DC-DC converter 100 or the DC-DC converter 200. The curves 302, 304, and 306 represent the efficiency versus load current of a DC-DC converter circuit that includes a single loop clamp circuit at −40° Celsius (C.), 25° C., and 125° C. with an input voltage of 5 volts, an output voltage of 1 volt, and a switching frequency of 1 megahertz. The curves 308, 310, and 312 represent the efficiency versus load current of the DC-DC converter 100 or the DC-DC converter 200 at −40° C., 25° C., and 125° C. with an input voltage of 5 volts, an output voltage of 1 volt, and a switching frequency of 1 megahertz. FIG. 3 shows that the DC-DC converter 100 and the DC-DC converter 200 are generally more efficient than DC-DC converter with the single loop clamp circuit, while the circuit area of the DC-DC converter 100 and the DC-DC converter 200 may be substantially smaller than that of the DC-DC converter with the single loop clamp circuit.

Figure 4:
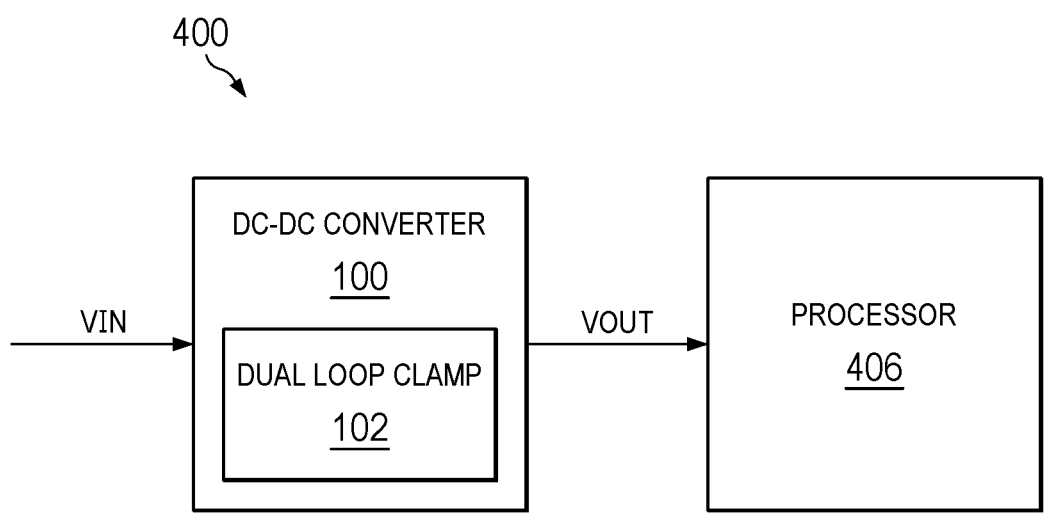
FIG. 4 is a block diagram of an example processor circuit that includes the DC-DC converter of FIG. 1 or FIG. 2.

FIG. 4 is a block diagram of an example processor circuit 400 that includes the DC-DC converter 100. The DC-DC converter 200 may be used in place of the DC-DC converter 100 in some implementations of the 400. The DC-DC converter 100 converts the power supply input voltage (VIN) to a voltage (VOUT) suitable for powering the processor 406. The processor 406 may be general-purpose microprocessor, a graphics processor, a network processor, a digital signal processor, an application specific processor, a field programmable gate array, or any other instruction execution circuit or electronic circuit. The dual loop clamp circuit 102 protects the DC-DC converter 100 from damage caused by switching transient overvoltage, improves the efficiency of the DC-DC converter 100 by reducing conflict at the gate of the low-side transistor 110, and enables the use of lower voltage transistors, which reduces the overall circuit area and cost of the DC-DC converter 100.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "on" means that the conduction channel of the FET is present and drain current may flow through the FET. References herein to a FET being "off" means that the conduction channel is not present and drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A dual loop clamp circuit, comprising:
   a clamp circuit including:
      a clamp enable output; and
      a low-side clamp output; and
   a low-side driver circuit including:
      a low-side control signal input;
      an output stage including:
         a low-side drive output coupled to the low-side clamp output; and
         an input coupled to the clamp enable output and the low-side control signal input; and
      a clamp enable stage including:
         an output coupled to the input of the output stage;
         an input coupled to the clamp enable output; and
         a transistor having:
            a first current terminal coupled to the input of the output stage;
            a second current terminal coupled to a ground terminal; and
            a control terminal coupled to the clamp enable output.

2. The dual loop clamp circuit of claim 1, wherein:
   the transistor is a first transistor; and
   the clamp enable stage includes:
      a second transistor having:
         a first current terminal coupled to a power supply terminal;
         a second current terminal coupled to the input of the output stage; and
         a control terminal coupled to the clamp enable output.

3. The dual loop clamp circuit of claim 2, wherein the clamp enable stage includes:
   a third transistor having:
      a first current terminal coupled to the second current terminal of the second transistor;
      a second current terminal coupled to the input of the output stage; and
      a control terminal coupled to the low-side control signal input.

4. The dual loop clamp circuit of claim 3, wherein the low-side driver circuit includes:
   an input stage including:
      an input coupled to the low-side control signal input; and
      an output coupled to the control terminal of the third transistor; and
   an intermediate stage including:
      an input coupled to the output of the input stage; and
      an output coupled to the input of the output stage.

5. The dual loop clamp circuit of claim 1, wherein the clamp circuit includes:
   a switching terminal;
   a Zener diode having:
      a cathode coupled to the switching terminal; and
      an anode coupled to the clamp enable output; and
   a first transistor having:
      a first current terminal coupled to the switching terminal;
      a second current terminal coupled to the low-side clamp output; and
      a control terminal coupled to the clamp enable output.

6. A dual loop clamp circuit, comprising:
   a clamp circuit configured to:
      monitor a voltage at a switching terminal; and
      provide a clamp enable signal based on the voltage at the switching terminal exceeding a clamp threshold voltage; and
   a low-side driver circuit coupled to the clamp circuit, and configured to:
      draw a first current from a drive output responsive to receipt of a low-side control signal at a low-side control signal input; and
      draw a second current, that is smaller than the first current, from the drive output responsive to the clamp enable signal.

7. The dual loop clamp circuit of claim 6, wherein:
   the low-side driver circuit includes:
      an output stage configured to draw the first current and the second current; and
      a clamp enable stage coupled to an input of the output stage and the clamp circuit, the clamp enable stage configured to cause the output stage to draw the second current responsive to the clamp enable signal.

8. The dual loop clamp circuit of claim 7, wherein the clamp enable stage includes:
   a transistor coupled to the clamp circuit and the output stage, the transistor configured to draw a current from the input of the output stage responsive to the clamp enable signal.

9. The dual loop clamp circuit of claim 7, wherein the clamp enable circuit includes:
   a transistor coupled to the clamp circuit, a power supply terminal, and the output stage, the transistor configured to reduce current flow from the power supply terminal to the input of the output stage responsive to the clamp enable signal.

10. The dual loop clamp circuit of claim 9, wherein:
    the transistor is a first transistor, and
    the clamp enable circuit includes a second transistor coupled to the first transistor and the output stage, the second transistor configured to switch current from the first transistor to the input of the output stage responsive to the low-side control signal.

11. The dual loop clamp circuit of claim 10, wherein the low-side driver circuit includes:
    an input stage configured to provide an inverted version of the low-side control signal, the input stage including:
       an input coupled to the low-side control signal input; and
       an output coupled to the clamp enable circuit; and
    an intermediate stage configured to invert the inverted version of the low-side control signal, the intermediate stage including:
       an input coupled to the output of the input stage; and
       an output coupled to the input of the output stage.

12. The dual loop clamp circuit of claim 6, wherein the clamp circuit includes:

a Zener diode coupled between the switching terminal and a clamp enable output, and having a reverse breakdown voltage that sets the clamp threshold voltage; and a transistor coupled between the switching terminal and a low-side clamp output, the transistor configured to switch current from the switching terminal to the low-side clamp output responsive to the clamp enable signal.

13. A DC-DC converter, comprising:

a high-side transistor including:
   a first current terminal coupled to a power input terminal; and
   a second current terminal;

a low-side transistor including:
   a first current terminal coupled to the second current terminal of the high-side transistor;
   a second current terminal coupled to a ground terminal; and
   a control terminal;

a clamp circuit coupled between the first current terminal of the low-side transistor and the control terminal of the low-side transistor, the clamp circuit configured to:
   provide a clamp enable signal responsive to a voltage at the first current terminal of the low-side transistor exceeding a clamp threshold voltage; and
   activate the low-side transistor responsive to the clamp enable signal; and a low-side driver circuit configured to weaken drive to the control terminal of the low-side transistor responsive to the clamp enable signal, the low-side driver circuit including:
   an input coupled to the clamp circuit; and
   an output coupled to the control terminal of the low-side transistor.

14. The DC-DC converter of claim 13, wherein the low-side driver circuit includes:
   an output stage configured to drive the control terminal of the low-side transistor; and
   a clamp enable stage coupled to an input of the output stage and the clamp circuit, the clamp enable stage configured to cause the output stage to weaken the drive to the control terminal of the low-side transistor responsive to the clamp enable signal.

15. The DC-DC converter of claim 14, wherein the clamp enable stage includes:

a transistor coupled to the clamp circuit and the output stage, the transistor configured to draw current from the input of the output stage responsive to the clamp enable signal.

16. The DC-DC converter of claim 14, wherein the clamp enable stage includes:
   a transistor coupled to the clamp circuit, a power supply terminal, and the output stage, the transistor configured to reduce current flow from the power supply terminal to the input of the output stage responsive to the clamp enable signal.

17. The DC-DC converter of claim 16, wherein:
   the transistor is a first transistor, and
   the clamp enable circuit includes a second transistor coupled to the first transistor and the output stage, the second transistor configured to switch current from the first transistor to the input of the output stage responsive to a low-side control signal.

18. The DC-DC converter of claim 17, wherein the low-side driver circuit includes:
   a low-side control signal input configured to receive the low-side control signal;
   an input stage configured to provide an inverted version of the low-side control signal, the input stage including:
      an input coupled to the low-side control signal input; and
      an output coupled to the clamp enable circuit; and
   an intermediate stage configured to invert the inverted version of the low-side control signal, and including:
      an input coupled to the output of the input stage; and
      an output coupled to the input of the output stage.

19. The DC-DC converter of claim 13, wherein the clamp circuit includes:
   a clamp enable output;
   a Zener diode coupled between the first current terminal of the low-side transistor and the clamp enable output, the Zener diode having a reverse breakdown voltage that sets the clamp threshold voltage; and
   a first transistor coupled between the first current terminal of the low-side transistor and a low-side clamp output, the first transistor configured to switch current from the first current terminal of the low-side transistor to the low-side clamp output responsive to the clamp enable signal.

* * * * *